United States Patent
Yen et al.

(12) 
(10) Patent No.: US 6,822,348 B2
(45) Date of Patent: Nov. 23, 2004

(54) SWITCH STRUCTURE

(75) Inventors: Heng-Chih Yen, Shindian (TW); Chen-Tung Sun, Pingtung Hsien (TW)

(73) Assignee: Arima Computer Corp., Taipei (TW)

( * ) Notice: Subject to any disclaimer, the term of this patent is extended or adjusted under 35 U.S.C. 154(b) by 137 days.

(21) Appl. No.: 10/214,077

(22) Filed: Aug. 6, 2002

(65) Prior Publication Data

US 2004/0026221 A1 Feb. 12, 2004

(51) Int. Cl.⁷ .............................................. H02H 19/14
(52) U.S. Cl. ....................... 307/115; 713/202; 340/825; 307/112; 307/113
(58) Field of Search ................................ 307/112, 113, 307/115

(56) References Cited

U.S. PATENT DOCUMENTS 5,530,302 A * 6/1996 Hamre et al. ............... 307/147
5,819,107 A * 10/1998 Lichtman et al. ............. 710/8
6,262,493 B1 * 7/2001 Garnett ........................ 307/64

* cited by examiner

*Primary Examiner*—Robert DeBeradinis
(74) *Attorney, Agent, or Firm*—Pro-Techtor International National Services

(57) ABSTRACT

A switch structure comprises a gripper, a splinted trough and a cutoff circuit. When the computer puts in the case of the server apparatus, the gripper can directly stick on the corresponding splinted trough to make the computer stick in case and trigger the cutoff circuit to generate a pulse signal to the computer for booting the computer. While unlocking, the cutoff circuit generates the other pulse signal to the computer to make a graceful computer shutdown.

18 Claims, 6 Drawing Sheets

SWITCH STRUCTURE

BACKGROUND OF THE INVENTION

1. Field of the Invention

This invention discloses a switch structure that applies to boot a computer while the computer is locked in the case of the server apparatus, on the contrary, shut down the power supply and the operation system in the computer while unlocking the computer in the case.

2. Description of the Related Art

In the prior arts, the server apparatus structure comprises two parts; one is inserting a plurality of motherboards in the case, and there are connectors in the back of the motherboard to connect the connectors in the backboard in the back of the case. As shown in FIG. 1, there are a case 101, a backboard 102 and a plurality of motherboards 103. There are two breaches 104 and 105 on the front and the back of the case 101, and there are a plurality of symmetric guiders 106 in the vertical inner side. The back-board 102 has two faces' 107 and 108, one face 107 sticks on the breach 105 on the back of the case 101 and there are a plurality of connectors 109 (each connector 109 electrically connects to each other) in the face 107. The back of the motherboard 103 sets at least a connector 110 and can completely set in the inner vertical symmetric guiders 106. While the motherboard 103 completely slides into the case 101, the connectors 110 of the motherboard 103 connect the corresponding connectors 109 of the backboard 102. Each motherboard 103 communicates each other through connecting the backboard 102.

The other server apparatus structure sets a plurality of computers in a base, every computer directly connecting a signal-exchange apparatus through network cables and network adapters in the computers to communicate each other. As FIG. 2 shows, there are a base 201, a plurality of connecting cables 202, a plurality of computers 203, network adapter 204 and a signal-exchange apparatus 205. A lot of parts of the side and interior of the base 201 are cut open to form a plurality of storage space 201 that slightly equal the volume of the signal-exchange apparatus 205 and the computer 203. Each computer 203 and a signal-exchange apparatus 205 stack up and down in the storage space 201 of the base 201. And the computers 203 directly connect a signal-exchange apparatus 205 through the network cable 202 and the network adapter 204 in the computer 203.

In the forgoing server apparatus structure, both lock the motherboard 103 or computer 203 in the case 101 or the base 201 through screw or equal locking apparatus (not shown in figures). And then We can boot each computer 203 through a power button to boot the server apparatus structure or through pressing each power button of the computer 203. On the contrary, we should turn off the operation system of the server apparatus structure or the computer 203 through corresponding apparatus (like mouse or keyboard), and then turn off the power of the server apparatus structure or the computer through operation system or manual (pressing the power button). After finishing these operations, we can take apart the screw or equal locking apparatus.

According to the foregoing description, we should lock every motherboard 103, and then press the button for booting. Or we should press the button to boot the computer 203 after locking the computer 203. In order to remove these defects, the invention discloses a switch structure that sets in each computer to reach the objective of locking and booting.

In addition, according to the foregoing art, we should first turn off the operation system and the power of the server apparatus structure or the computer 203 in order, and then take apart the screw or equal locking apparatus. The invention discloses a switch structure that sets in each computer to reach the objective of unlocking and turning off the operation system and the power supply in order to overcome the defects of the foregoing arts.

SUMMARY OF THE INVENTION

The first objective of the invention discloses a switch structure that can lock and boot apparatus simultaneously to solve the defects of locking each motherboard for booting in the prior art.

The second objective of the invention discloses a booting structure that can lock and boot apparatus simultaneously to overcome the defects of locking the computer for pressing the button in the prior art.

The third objective of the invention discloses a switch structure that can unlock and turn off the operation system and the power apparatus simultaneously to solve the defects of turning off the operation system and the power of the server apparatus structure in order for taking apart the screw or equal locking apparatus and then taking apart each motherboard in the prior art.

The fourth objective of the invention discloses a switch structure that can unlock and turn off the operation system and the power apparatus simultaneously to solve the defects of turning off the operation system and the power of the computer in order for taking apart the said screw or equal locking apparatus and then taking apart each computer in the prior art.

According to the above-mentioned objectives, this invention discloses a switch structure that applies to boot the computer while the computer is locked in the case of the server apparatus. Such switch structure comprises at least a first buckle, a second buckle and a cutoff circuit. The first buckle can be a gripper setting on one side in front of the computer. The second buckle can be a splinted trough corresponding to the gripper and the splinted trough is in the front outside of the case. The cutoff circuit comprises a circuit switch component and a pulse generating circuit component. The circuit switch component is a micro switch, one terminal of the circuit switch component connects the splinted trough, and the other terminal connects one terminal of the pulse generating circuit component. The other terminal of the pulse generating circuit component connects the computer. When the computer puts in the case of the server apparatus, the circuit switch component can be triggered to make the pulse generating circuit component to generate a pulse signal to the power control device of the computer for booting the computer through the gripper sticking on the corresponding splinted trough. On the contrary, while we draw out the computer from the server apparatus, we should just unlock the gripper and the splinted trough and the circuit switch component can be triggered to make the pulse generating circuit component to generate a pulse signal to the interrupt component of the computer for turning off the operation system of the computer through a interrupt signal from the interrupt component, and then turn off the power supply through the power control device.

The power control device can be a microprocessor to control the power supply status of the computer. The pulse generating circuit component can be a R-C circuit or the equivalent circuit thereof that can immediately generate a pulse through connecting the circuit switch component; the pulse is used for triggering the interrupt component of the computer. The interrupt component can be an interrupt control unit in the south bridge chip, such as a GPIO (General Purpose Input/output) unit or a system power management unit. Wherein, the interrupt Control unit often applies to control IRQ (Interrupt Request), like IRQ1–IRQ15; the GPIO unit often applies to control the SCI (System Control Interrupt) established, by the Microsoft company; and the SMI (System Management Interrupt) established by the Intel company. While the interrupt control unit, GPIO unit or the system power management unit sends the corresponding interrupt signal, such as IRQ, SCI or SMI, to CPU, the operation system will be informed to start the shutdown function through the corresponding interrupt service program. After a series of saving action of the operation system, the power control device will be informed to turn off the power supply.

BRIEF DESCRIPTION OF DRAWINGS

The following detailed description, given by way of examples and not intended to limit the invention to the embodiment described herein, will be best to understand in conjunction with the accompanying drawings, in which.

DETAILED DESCRIPTION OF THE INVENTION

Figure 1:
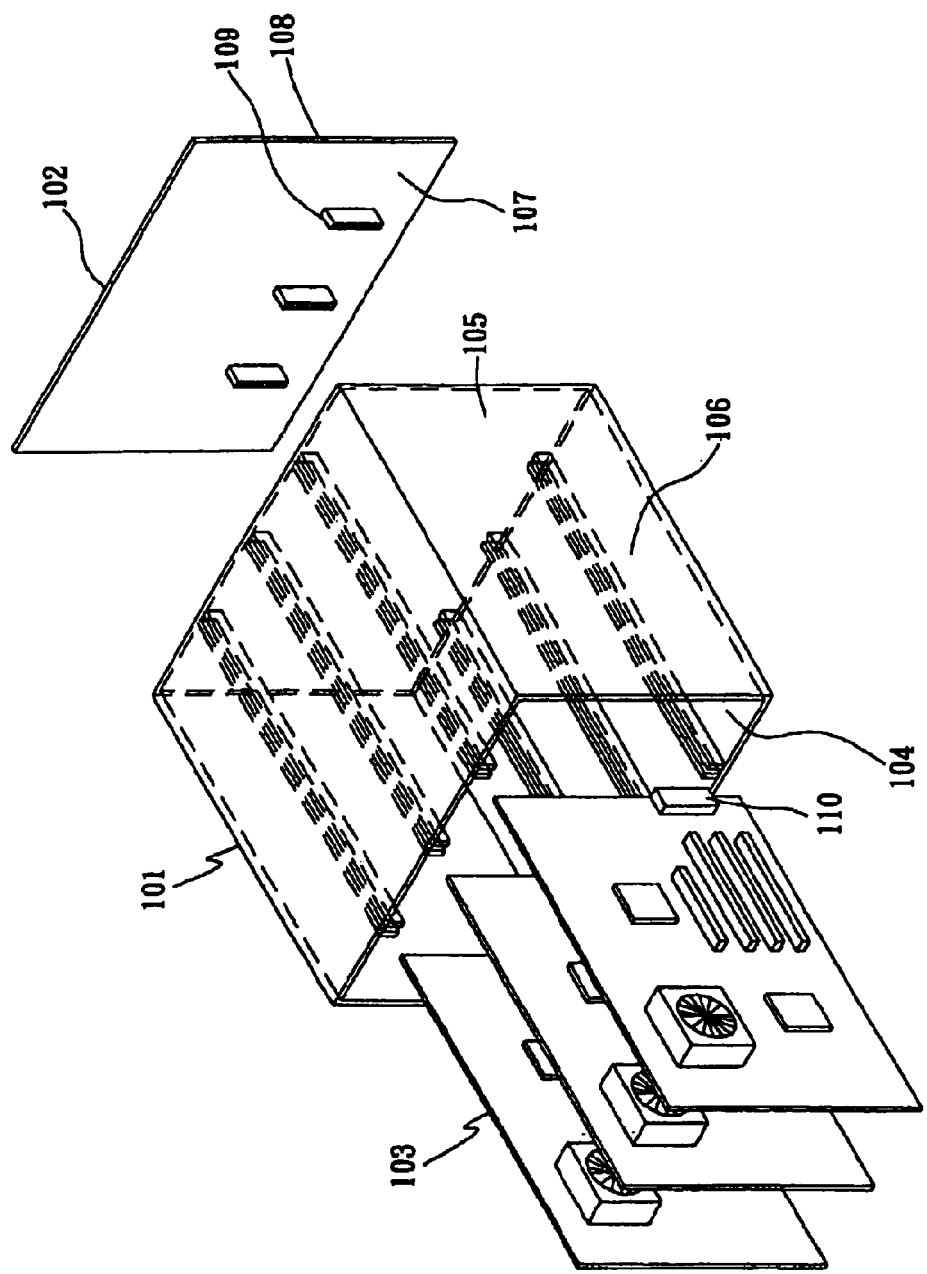
FIG. 1 illustrates a perspective drawing of the server apparatus structure in the prior art.
Figure 2:
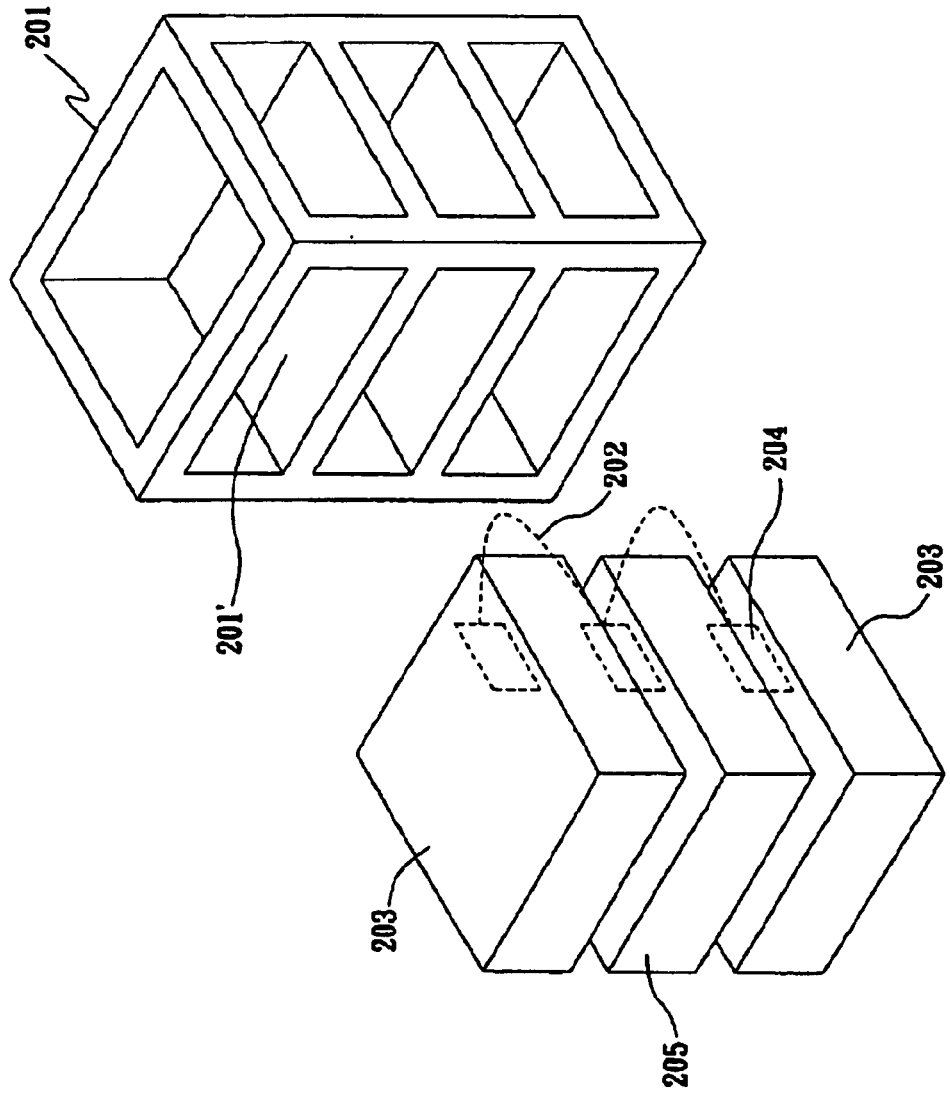
FIG. 2 illustrates a perspective drawing of the server apparatus structure in the other prior art.
Figure 3:
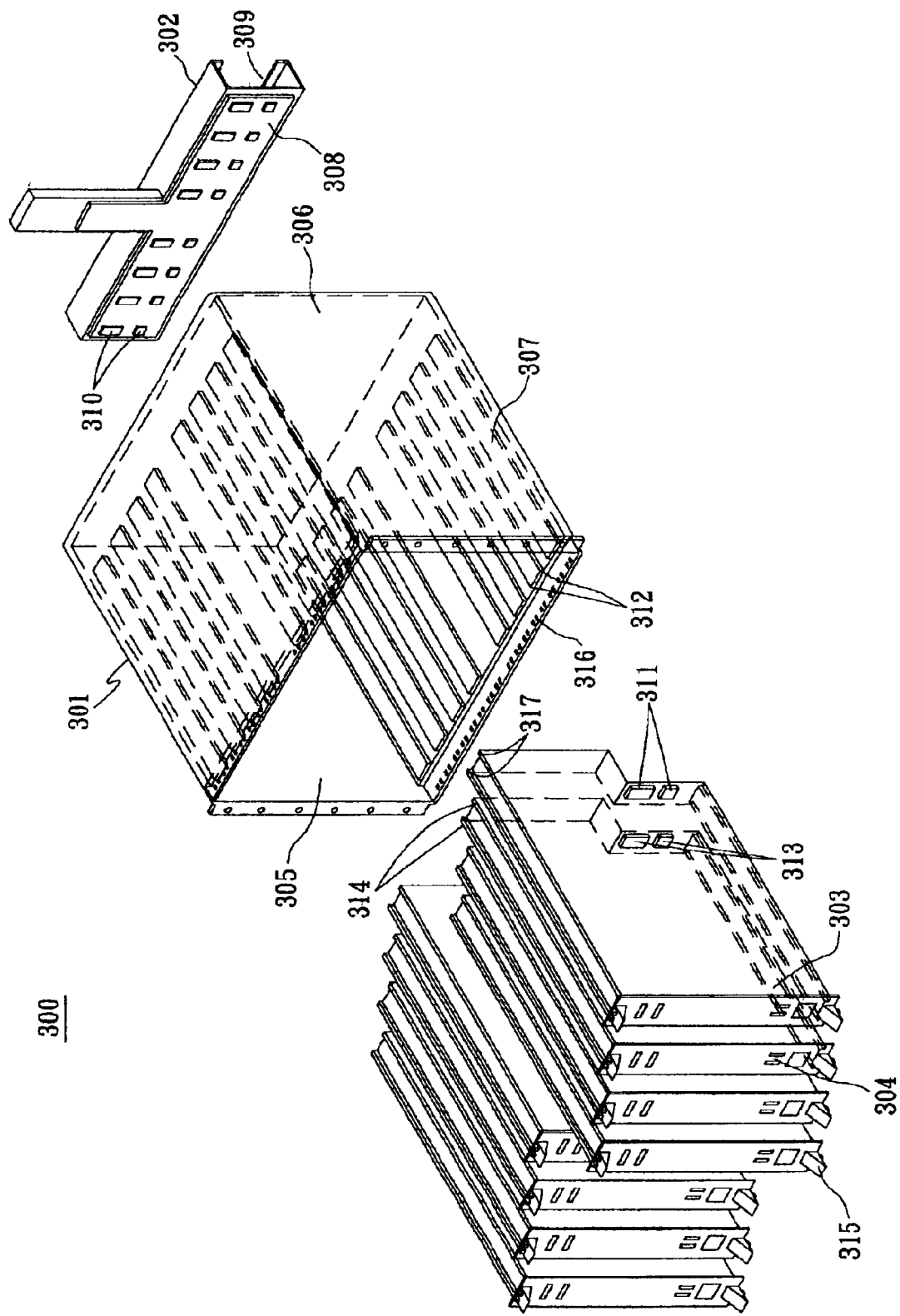
FIG. 3 illustrates a perspective drawing of the server apparatus structure in the invention.

Referring to FIG. 3, it discloses the server apparatus structure 300 of the invention, which comprising a case 301, a backboard 302, at least a signal-exchange apparatus 303 and a plurality of computer apparatuses 304. There are two breaches 305 and 306 on the front and the back of the case 301, and there are a plurality of symmetric guiders 307 in the vertical inner side. The backboard 302 has two faces 308 and 309, one face 308 sticks on the breach 306 of the back of the case 301 and sets a plurality of connecting slots 310, each slot 310 electrically connecting to the others. The back of the signal-exchange apparatus 303 sets at least a first connector 311. And the vertical width 314 of signal-exchange apparatus 303 is slightly smaller than the width 312 of the guider 307; by this, we can set signal-exchange apparatus 303 through the symmetric guider 307 into the case 301. The back of the computer apparatus 304 sets at least a second connector 313 and the vertical width 314 of the computer apparatus 304 is slightly smaller than the width 312 of the guider 307; by this, we can set computer apparatus 304 via the symmetric guider 307 into the case 301. While the computer apparatus 304 and the signal-exchange apparatus 303 completely slide into the case 301, the first connector 311 and the second connector 313 wedge in the corresponding connect slots 310.

Besides, there is a gripper 315 on each of the both sides in the front of the computer apparatus 304 and the signal-exchange apparatus 303 that sticks on the corresponding splinted trough 316 on the both sides of the breach in the front of the case 301.

Figure 4:
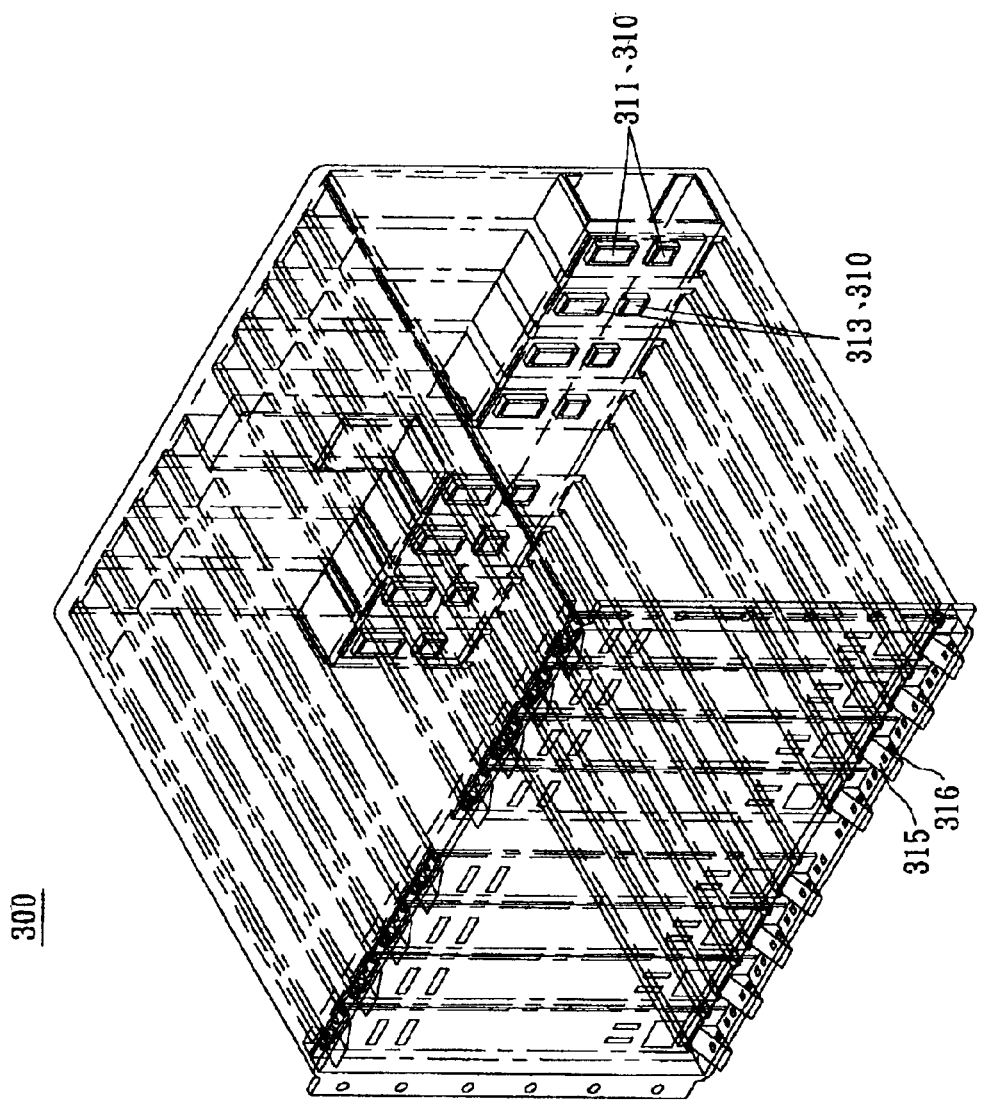
FIG. 4 illustrates a combinative and perspective drawing of the server apparatus structure in the invention.

FIG. 4 illustrates a combination perspective drawing of the server apparatus structure 300 in the invention, while the signal-exchange apparatus 303 and the computer apparatus 304 completely slide into the case 301 through the guider 307 of the case 301, the first connector 311 and the second connector 313 wedge in the corresponding connect slots 310. And the grippers 315 on the both sides in the front of the computer apparatus 304 and the signal-exchange apparatus 303 sticks on the corresponding splinted trough 316 on the both sides of the breach in the front of the case 301.

Figure 5:
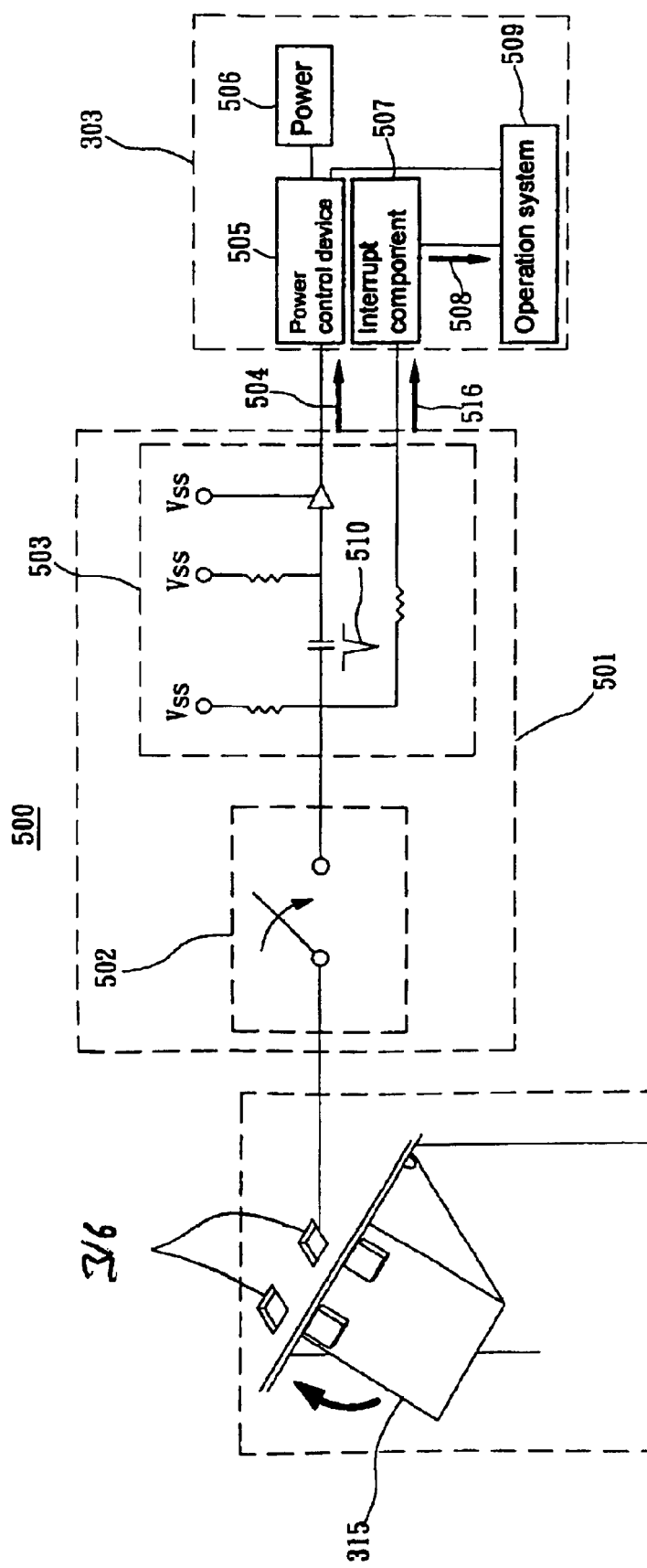
FIG. 5 illustrates a switch structure diagram one in the invention.

In order to use the connectors like gripper 315 and splinted trough 316 effectively, referring to FIG. 5 that illustrates a switch structure 500 diagram in the invention, the switch structure 500 combines the foregoing connectors and an extra cutoff circuit 501 in the computer apparatus 304 to reach the objectives of the invention. In the figure, there are a gripper 315, a splinted trough 316 and a cutoff circuit 501. The gripper 315 is on one side in front of the computer 304. The splinted trough 316 corresponds to the gripper 315 and the splinted trough 316 is in the front outside of the case 301. The cutoff circuit 501 comprises a circuit switch component 502 and a pulse generating circuit component 503. The circuit switch component 502 is a micro switch, one terminal of the circuit switch component 502 connects the splinted trough 316, and the other terminal connects one terminal of the pulse generating circuit component 503. The other terminal of the pulse generating circuit component 503 connects the computer 303. When the computer 303 puts in the case 301 of the server apparatus 300, the circuit switch component 502 can be triggered to make the pulse generating circuit component 503 generate a pulse signal 504 to the power control device 505 of the computer 303 for booting the power 506 of the computer 303 through the gripper 315 sticking on the corresponding splinted trough 316. On the contrary, while we draw out the computer 303 from the server apparatus 300, we should just unlock the gripper 315 and the splinted trough 316 and the circuit switch component 502 can be triggered to make the pulse generating circuit component 503 generate a pulse signal 516 to the interrupt component 507 of the computer 303 for turning off the operation system 509 of the computer 303 through a interrupt signal 508 from the interrupt component 507, and then turn off the power 506 through the power control device 505.

The power control device 505 can be a microprocessor to control the power 506 supply status of the computer 303. The pulse generating circuit component 503 can be a R-C circuit or the equivalent circuit thereof that can immediately generate a pulse 510 through connecting the micro switch 502; the pulse 510 is used for triggering the interrupt component 507 of the computer 303 to generate an interrupt signal from the computer apparatus 303 like SMI#. And then the operation system will enter System Management Mode to make the computer apparatus 303 soft shut down and turn off the power for making a graceful computer shutdown through interrupt service program like SMI Handler.

Figure 6:
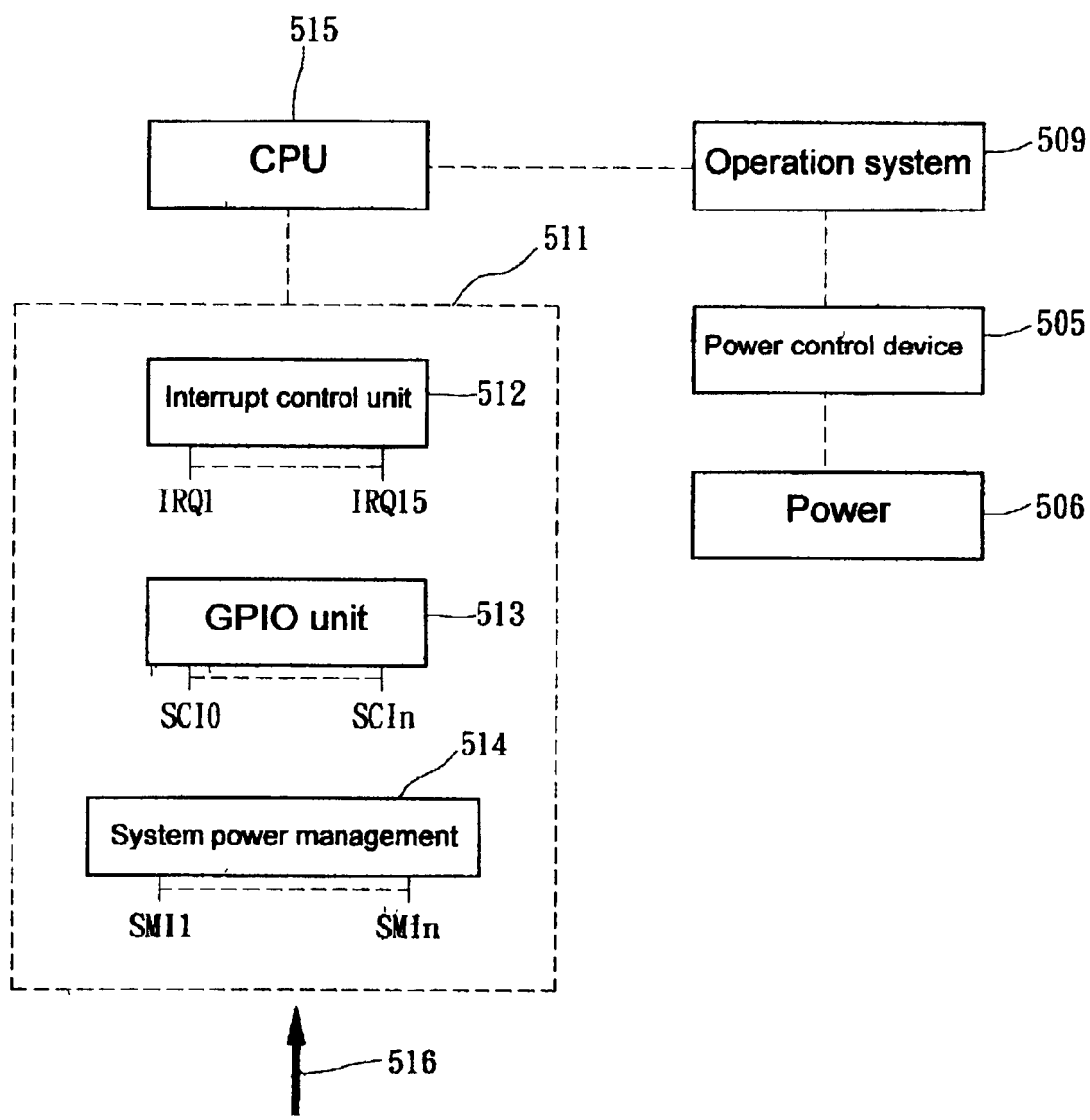
FIG. 6 illustrates a switch structure diagram two in the invention.

Referring to FIG. 6, the interrupt component 507 can be an interrupt control unit 512 in the south bridge chip 511, such as a GPIO (General Purpose Input/output) unit 513 or a system power management unit 514. The interrupt control unit 512 is often used to control IRQ (Interrupt Request), such as like IRQ1–IRQ15. The GPIO unit 513 is often used to control the SCI (System Control Interrupt) established by the Microsoft company. And the system power management unit 514 is often used to control the SMI (System Management Interrupt) established by the Intel company. While the interrupt control unit 512 in the south bridge chip 511, the GPIO unit 513 or the system power management unit 514 sends the corresponding interrupt signal (like IRQ, SCI or SMI) to CPU 515, CPU 515 notifies the operation system 509 to start the shutdown function through the corresponding interrupt service program. After a series of saving action of the operation system 509, CPU 515 notifies the power control 505 to turn off the power supply.

Although described above in connection with the preferred embodiments, one skilled in the art will appreciate that the present invention can be implemented in other embodiments while remaining within the scope of the present invention as defined in the claims as follows.

What is claimed is:

1. A switch structure that boots a computer when said computer is locked into a case of a server apparatus, said switch structure comprising:

at least one first buckle provided on said computer, at least one second buckle corresponding in location to said at least one first buckle, and a cutoff circuit comprising a circuit switch component connecting said second buckle to a pulse generating circuit component connected to said computer; wherein, when said computer is placed in said case, said first buckle contacts said second buckle so as to trigger said circuit switch component to cause said pulse generating circuit component to generate a pulse signal that is sent to said computer, thereby booting said computer.

2. The switch structure of claim 1, wherein:

said first buckle is a gripper and said second buckle is a splinted trough corresponding in location to said gripper.

3. The switch structure of claim 1, wherein:

said circuit switch component is a micro switch.

4. The switch structure of claim 2, wherein:

said circuit switch component has two terminals, a first one of said terminals being connected to said splinted trough, and a second one of said terminals being connected to said pulse generating circuit component.

5. The switch structure of claim 1, wherein:

said pulse generating circuit component has two terminals, a first one of said terminals being connected to said circuit switch component, and a second one of said terminals being connected to said computer.

6. The switch structure of claim 1, wherein:

said pulse generating circuit component transmits said pulse signal to a power control component of said computer.

7. The switch structure of claim 6, wherein:

said power control component is used to control a power supply of said computer.

8. The switch structure of claim 1, wherein:

said pulse signal is a negative pulse.

9. A switch structure that turns off an operation system and a power supply in a computer when said computer is removed from the case of a server apparatus, said switch structure comprising:

at least a first buckle provided on said computer, at least a second buckle in electrical connection with said first buckle, and a cutoff circuit comprising a circuit switch component connected to said second buckle and a pulse generating circuit component connected to said computer; wherein, when said computer is removed from said case, the electrical connection between said first buckle and said second buckle is broken, thereby triggering said circuit switch component to activate said pulse generating circuit component to generate a pulse signal to an interrupt component of said computer, thereby turning off said operation system and said power supply through a interrupt signal generated by said interrupt component.

10. The switch structure of claim 9, wherein:

said first buckle is a gripper and said second buckle is a splinted trough corresponding in location to said gripper.

11. The switch structure of claim 9, wherein:

said circuit switch component is a micro switch.

12. The switch structure of claim 10, wherein:

said circuit switch component has two terminals, a first one of said terminals is connected to said splinted trough, and a second one of said terminals is connected to said pulse generating circuit component.

13. The switch structure of claim 9, wherein:

said pulse generating circuit component has two terminals, a first one of said terminals is connected to said circuit switch component, and a second one of said terminals is connected to said computer.

14. The switch structure of claim 9, wherein: said pulse signal is a negative pulse.

15. The switch structure of claim 9, wherein: said interrupt signal is a system management interrupt signal.

16. The switch structure of claim 9, wherein: said interrupt signal is an interrupt request signal.

17. The switch structure of claim 9, wherein: said interrupt signal is a system control interrupt signal.

18. The switch structure of claim 9, wherein: said pulse generating circuit component is an R-C circuit or an equivalent thereof.

* * * * *